Jan. 29, 1946.  E. E. SIMMONS, JR  2,393,714
STRAIN GAUGE
Filed July 23, 1941  4 Sheets-Sheet 1
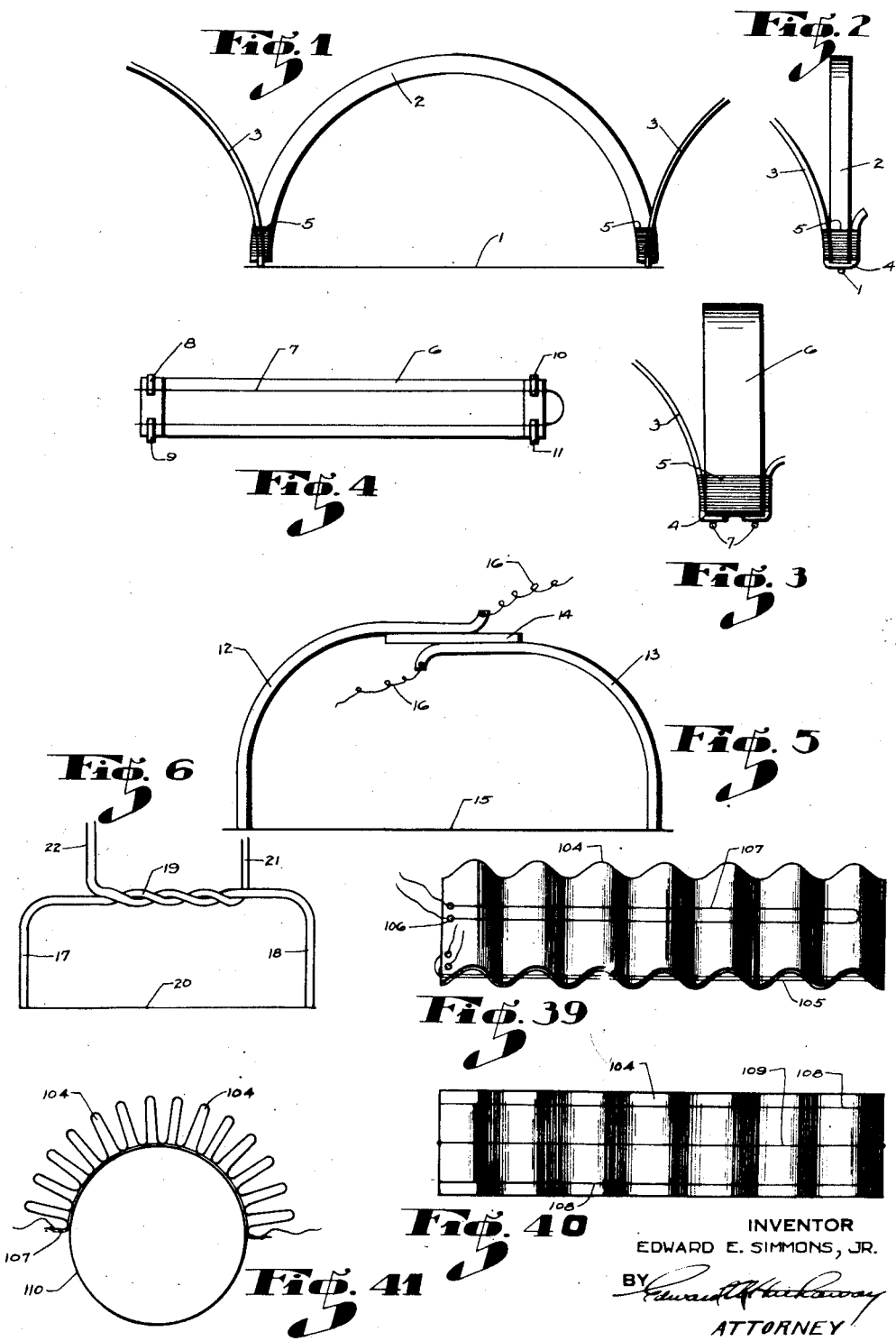
INVENTOR
EDWARD E. SIMMONS, JR.
BY
ATTORNEY Jan. 29, 1946. E. E. SIMMONS, JR 2,393,714
STRAIN GAUGE
Filed July 23, 1941 4 Sheets-Sheet 2
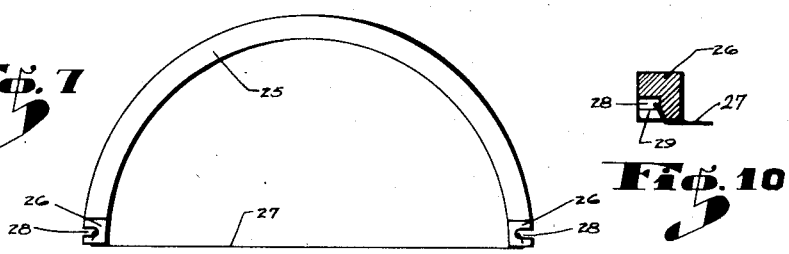
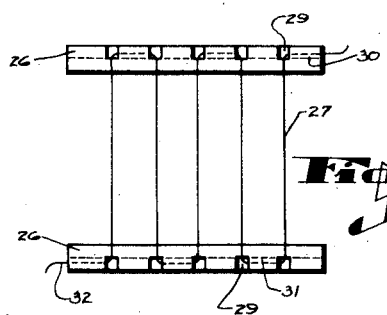
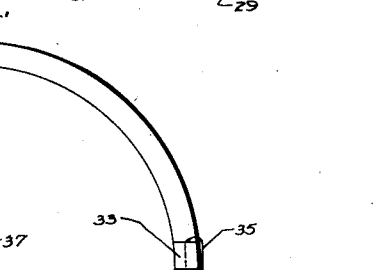
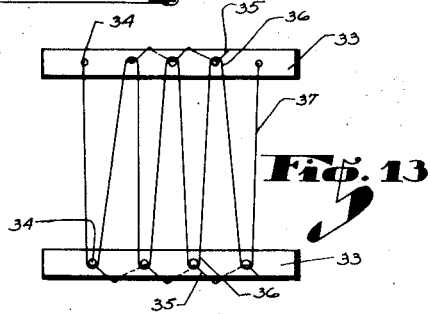
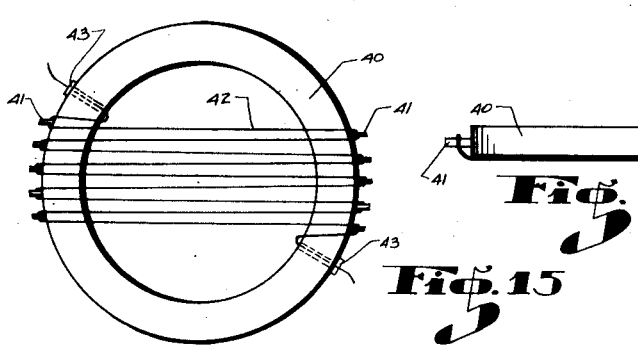
INVENTOR
EDWARD E. SIMMONS, JR.
BY
Attorney

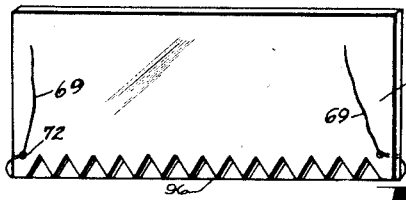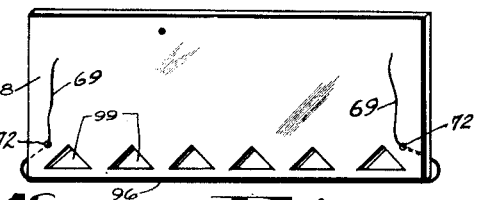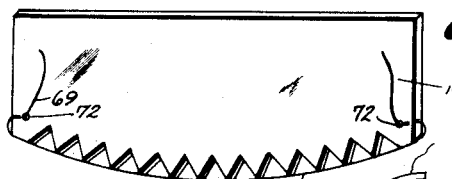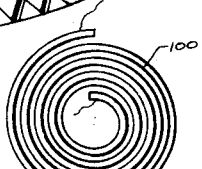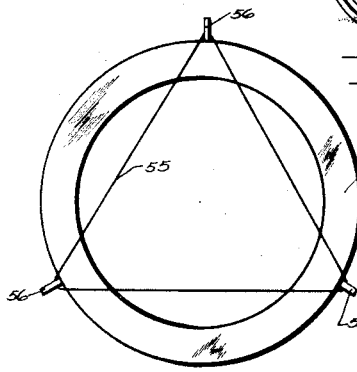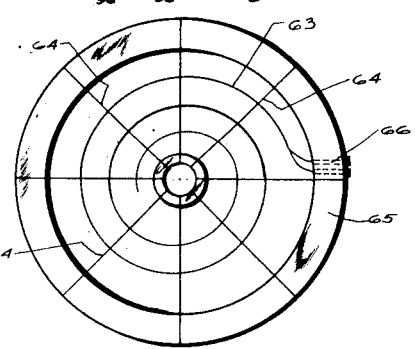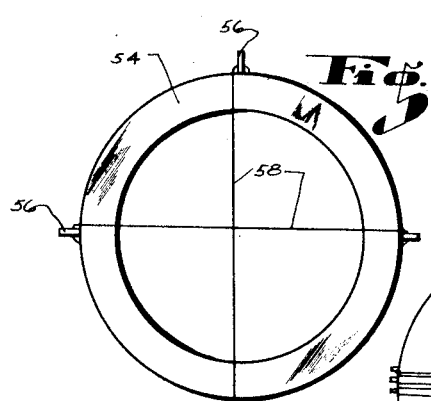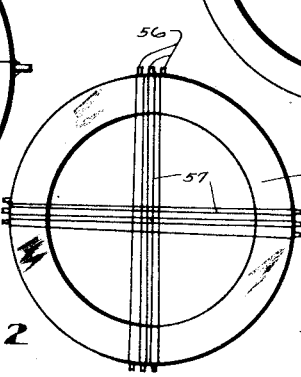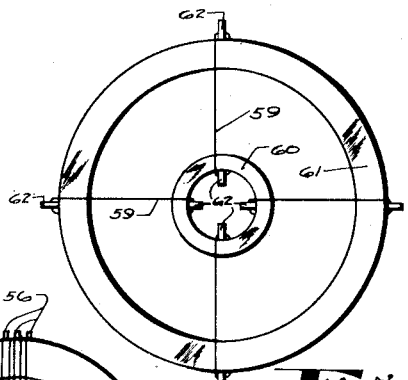

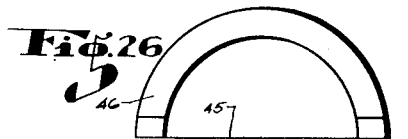
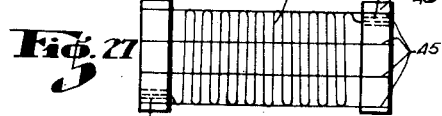
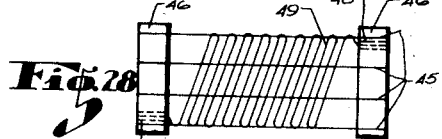
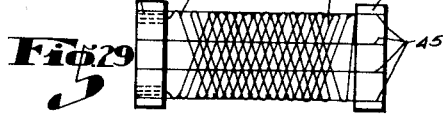
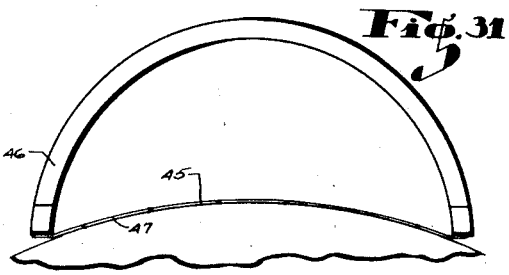
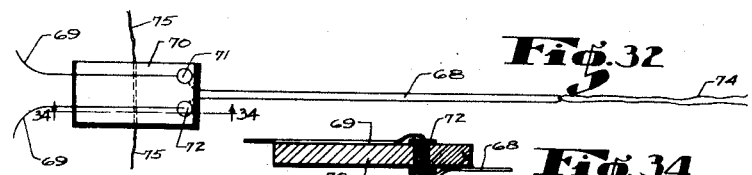
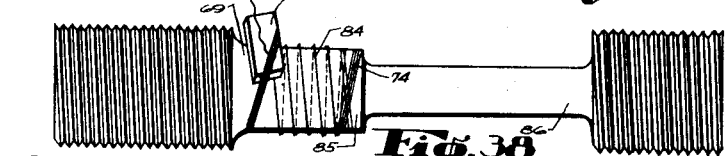
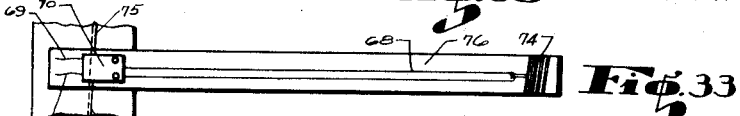
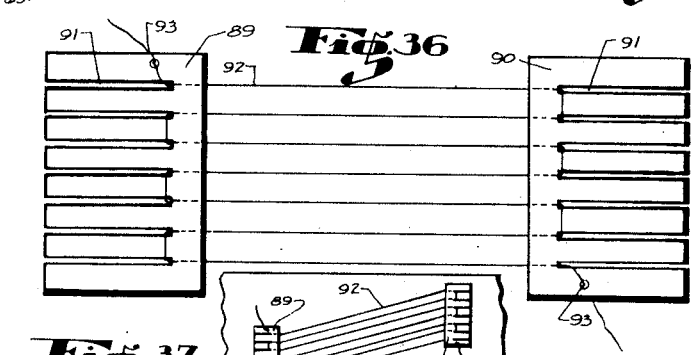
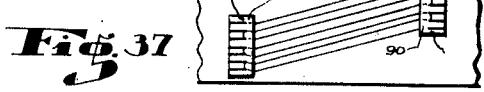
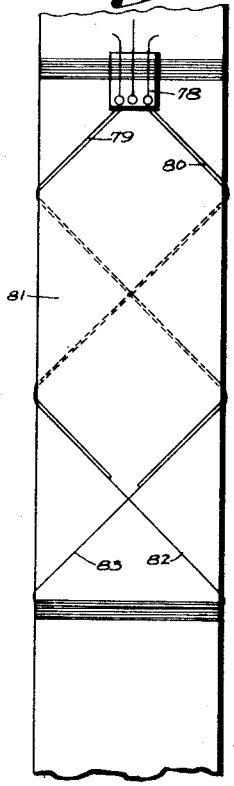
INVENTOR
EDWARD E. SIMMONS, JR.
Attorney

UNITED STATES PATENT OFFICE 2,393,714

STRAIN GAUGE

Edward E. Simmons, Jr., Pasadena, Calif.

Application July 23, 1941, Serial No. 403,717

13 Claims. (Cl. 73—88)

This invention relates generally to strain gauges of the type having an electrical strain sensitive wire filament bonded throughout its effective length to a member to be tested and relates more particularly to an improved method and apparatus for supporting and for applying the filament to the test member, it being understood that by "strain sensitivity" is meant that the electrical resistance of the wire varies in a predetermined manner with its strain and accordingly by measuring the variation of electrical resistance of the filament it is possible to determine the strain and stress of a member to which the filament is bonded.

Strain sensitive filaments used in the above type of gauge have been heretofore generally bonded to a membrane usually in the form of a thin piece of paper to form a unit therewith, the paper in turn being bonded to a member under test. This arrangement has limitations as to its adaptability to various applications as well as being relatively costly and requiring considerable time to apply the gauge.

It is an object of my invention to provide an improved bonded type strain sensitive wire gauge that has versatility of application and is economical in manufacture and operation while maintaining the usual accuracy, sensitivity and reliability of gauges of this type.

Another object is to provide an improved gauge of the above type that requires minimum time in its application to a test member.

A further object is to provide an improved method and apparatus for supporting or handling the filament during application thereof to a member under test.

A still further object is to provide an improved gauge of the above type and an improved method of applying the same whereby the gauge may be easily and readily attached to or removed from a member under test so as to be usable in other tests.

Other objects and advantages will be more apparent to those skilled in the art from the following description of the accompanying drawings in which:

Fig. 1 is a side elevation of a curved bar form of filament support;

Fig. 2 is an end elevation of Fig. 1;

Fig. 3 is an end elevation of a gauge of the general type shown in Figs. 1 and 2 but having two filaments instead of one;

Fig. 4 is a view looking up at the under side of Fig. 3;

Fig. 5 is a side elevation of a modified form of arched gauge support in which its component parts are so arranged that they may be made of thin metal ribbon supports;

Fig. 6 is a further modification showing the gauge support formed of two insulated members twisted together;

Fig. 7 is a further modification of the Fig. 1 form;

Fig. 8 is an end view of Fig. 7 showing how this modification employs a multiplicity of filament strands;

Fig. 9 is a view looking up at the bottom of Fig. 8;

Fig. 10 is a section on line 10—10 of Fig. 8;

Fig. 11 is a side elevation of a modified form of gauge of the general type shown in Figs. 7 to 9 but arranged to support the multiple wire filaments in a different manner;

Fig. 12 is an end view of Fig. 11;

Fig. 13 is a view looking up at the bottom of Fig. 12;

Fig. 14 is a side elevation of a circular filament support;

Fig. 15 is a view looking up at the bottom of Fig. 14;

Fig. 16 is a perspective of a card type of filament support specifically adapted to lay the filament in a flat position;

Fig. 17 is a perspective of a modified arrangement of Fig. 16 showing a filament laid along a curved surface;

Fig. 18 is still another modification of the card type of filament support specifically shown as providing a continuous supporting surface for the filament;

Figs. 19, 20, 21 and 22 are bottom plan views of an annular type support provided respectively with filaments arranged triangularly, spirally, crosswise in a single strand and crosswise in multiple strands;

Fig. 23 is still a further modified arrangement of filaments mounted upon concentric annular supports;

Fig. 24 illustrates the versatility of application of the card type gauge wherein it is wrapped in a spiral form;

Fig. 25 illustrates a further application of the card type gauge showing a series of the same stacked together;

Fig. 26 is a side elevation of a further modified arrangement of the gauge wherein the filaments are strung between wire supports;

Fig. 27 is a view looking up at the bottom of Fig. 26;

Fig. 28 shows the filaments supported diagonally between the wire supports;

Fig. 29 is a further modification of Fig. 27 showing the filaments arranged diagonally in opposite directions between the wire supports;

Fig. 30 is a view similar to Fig. 27 but showing the manner in which an exceedingly long gauge length may be employed with suitable reinforcement of the gauge filaments;

Fig. 31 is a side elevation similar to Fig. 26 but showing the application of the gauge to a circular surface;

Fig. 32 is a plan view of a further modification showing an extremely simple manner for supporting and positioning the filament;

Fig. 33 is a plan view showing the gauge of Fig. 32 applied to a member;

Fig. 34 is an enlarged sectional view taken substantially on the line 34—34 of Fig. 32;

Fig. 35 illustrates the same type of gauge shown in Fig. 32 but of the multiple filament type which is specifically shown as wrapped around a circular shaft or other suitably shaped member for measuring the strain or torsion thereof;

Fig. 36 is a plan view of a still further modified gauge arrangement in which a single filament may be easily strung between two flat supports;

Fig. 37 illustrates another application of the form of gauge shown in Fig. 36;

Fig. 38 illustrates one application of the type of gauge shown in Fig. 32;

Fig. 39 is a perspective of a corrugated card or sheet type gauge;

Fig. 40 is a modified form of corrugated card type gauge in which the corrugations are longitudinally reinforced by wires; and Fig. 41 illustrates the versatile application of the corrugated type of gauge.

In the particular embodiments of the invention shown herein for the purpose of illustration, I eliminate the necessity of having the solvent bonding cement slowly escape through the paper supporting member as is usual in prior bonded wire type gauges but in order to eliminate this undesirable feature I have provided improved means for adequately supporting and handling the wire filament both before it is applied to a member under test as well as during the actual application of the filament to the member, it being understood that the cross-sectional area of the filament is extremely minute and hair-like having a diameter preferably as low as one one-thousandth of an inch although a diameter of three one-thousandths of an inch has been employed. In providing my improved gauge I not only minimize the time required for a filament to be applied to a member but I have at the same time greatly improved the versatility of application of the gauge and reduced its cost to a very low value while retaining all of its desirable characteristics such as are pointed out in my copending application Serial No. 320,327, filed February 23, 1940. It will be understood that the gauges disclosed herein are used in any suitable circuits, such as disclosed in said copending application, for determining the change of resistance in the filament.

In Fig. 1 a single strand of strain sensitive filament 1 is attached to a curved spring support 2 of suitable insulating material such as thin strip Bakelite. Wire leads 3 of relatively heavy cross-sectional area are suitably bonded as at 4 around the ends of frame 2 and suitably secured thereto as by thread wrappings 5 or both. The wire filament 1 is preferably soldered, welded or otherwise suitably secured to the under side of the bent ends 4 of the conductor leads 3. The gauge length of the filament is determined by the distance between the points of attachment to the conductor ends 4 and because of the resilient character of the curved spring support 2 the filament will be maintained in a slightly taut condition, although the filament may be applied in an untaut condition to the surface of a member to be tested. The filament is preferably insulated by enamel over its entire surface but if desired an insulating fabric cover may be employed. To use the filament of Fig. 1 the operator holds the center of the spring support between two fingers and presses the filament in a desired position on a member to be tested. Cement is then painted or otherwise applied over the filament and the surface of the test member and the filament held in position until the cement hardens through evaporation of the solvent. Or, if desired, the cement may be first brushed on the member to be tested and the gauge filament placed on the wet cement in the above manner. Inasmuch as the filament is a wire preferably between one-thousandth and three-thousandths of an inch diameter, it is seen that if the cement is first brushed on the member the filament will be readily embedded in its entirety within the film of cement. As there is no impediment to the evaporation of the cement solvent, setting will occur in a minimum of time. This open type of filament is especially useful when used in conjunction with cold setting volatile solvent cement such as the "Duco" household cement which is well-known in the trade. Another advantage is that when the cement sets, the wire filament is bonded directly to the member to be tested without an intervening paper layer membrane. This results in the filament being attached to the member through a more direct and stiffer connection than if an intervening membrane were required and hence my improved arrangement insures a maximum of good performance.

It will be understood that the filaments mentioned herein throughout are to be considered as of the same kind and character of material disclosed in my said copending application and that the filaments are metallic wires continuously solid throughout their length and while preferably circular in cross-section may nevertheless be of other shapes if desired, although the circular shape is more readily obtainable in the open market in the form of drawn wire. Other forms of volatile solvent cement that might be used are "Glyptal," "de Kohtinsky," "methyl methacrylate cement" and "Vinylite XL 5075 cement." In all forms of gauges disclosed herein the filaments are bonded throughout their length to the member under test by any of the cements referred to herein or any other suitable or equivalent cements.

If it is desired to employ a double strand filament then the flexible support 6 may be made somewhat wider as shown in Fig. 3 and a filament 7 is reversely bent and soldered or otherwise suitably connected to terminal leads 8, 9 and 10, 11. These leads are secured to the ends of the curved spring support in the same manner as described for Fig. 1. The leads at each end of the spring support of Fig. 4 permit both strands of the filament to be employed in series whereby connections are made only with leads 8 and 9 or two separate strands may be used by taking connections off of leads 8 and 10 and also off of 9 and 11. The curved spring bar supports 2 and 6 are formed of insulating material such as Bakelite or other suitable yieldable insulating material.

In the use of either Fig. 1 or 4 the mode of attachment of the filament to the leads permits the filament to lie along the surface of a member to which it is attached at all points along its length. If it is desired to place the filament I on a convex surface it is only necessary for the operator to hold between his finger tips the center portion of the curved bar 2 or 6 and then press the filament against the curved surface until the entire length of filament engages the surface. During this operation the support 2 will flex sufficiently to accommodate the filament I to its curved position. Thus it is seen that the filament can be readily adapted to convex surfaces having a wide range of diameters and that regardless of the diameter of the member under test the gauge length will be uniform in each instance, it being understood, of course, that the support 2 is relatively thin so as to not subject filament I to excessive tension. In the manufacture of this gauge a preferably bare filament wire is employed so that soldering to the leads e. g. 3 is readily accomplished. Thereafter the assembled filament is dipped in wellknown wire enamel and baked successively until a suitable thickness of insulation is built up on the filament. In addition to insulating the filament, the enamel bonds the end fastenings 4 and 5 to the support bar.

In the modification shown in Fig. 5 a pair of thin metal ribbon supports 12 and 13 are split in the middle and fastened together with an insulated separator 14. The filament 15 is soldered or welded to the ends of the curved support bar and flexible leads 16 are attached to turned ends of the ribbon sections.

In Fig. 6, two insulated wire sections 17 and 18 are twisted together as at 19 to form a support member for a filament 20 which is soldered or welded to the ends of the wires 17 and 18. Suitable leads 21 and 22 may be connected to the respective wire sections.

To provide a multi-loop mesh filament, Fig. 7, a suitable spring arched support 25 is provided with T heads 26 at each end of the support. This support may be made of Bakelite or other suitable electrical insulating material. The filament 27 is attached to the T supports by a notch arrangement consisting of a longitudinal slit 28 formed along the outer side of each T head 26 while slots 29, Fig. 10, are cut through the outer bottom corners of the T heads so as to communicate with the slots 28. The filament first enters the longitudinal slot at the point 30 and then bends downwardly, Fig. 9, through the first notch 29 and thence across to the notch on the other T head where it is turned into the longitudinal slot at the point 31 from which the next filament strand turns out through the next adjacent notch 29 to extend back to the other T head and so on until the filament terminates at 32. The filament may be secured at its ends to the head I by thread wrappings, cementing or by a riveted arrangement described hereafter. In this form of gauge the filament strands lie along a straight line in a plane just slightly below the under surface of the T heads thereby insuring complete and uniform contact with a member under test when the filament is cemented thereto in the manner previously described for other modifications. Again, either a bare or pre-insulated filament is suitable, although single silk covered filament wire has been found to be satisfactory. The absence of enamel on the wire permits easy soldering of the ends to usual connection leads which may be bonded to the T heads in the manner shown in Figs. 1 and 2, although the silk covering on the filament provides a strong thin insulating layer. When silk covering is used it is impregnated with Glyptal before being used thereby not only insulating the filaments, but also bonding the same to the T heads of the supporting member. When bare wire is used any usual enamel may be formed on the filament and built up to any desired thickness by successive dipping and baking with wire enamel.

As shown in Figs. 11, 12 and 13, a filament of the form in Figs. 7 to 9 may be attached to T heads 33 by providing a series of vertical holes and then passing a thin silk thread 35 through such holes and around the bent ends 36 of the filament loops 37 and up the outside of the T supports 33 to hold the filament in the plane of the support bottom. The filament and support is then cemented together with Glyptal or with wire enamel if bare filament strands are used. The flexible arch support 25' connects T heads 33.

The versatility of my invention is shown not only by its adaptability to straight or curved surfaces in an easy and quick manner, but also by the forms that the invention may take to meet many special conditions and situations. This is illustrated, in one instance, in Figs. 14 and 15 wherein a thin circular hoop 40 is preferably of Bakelite or other suitable insulating material is provided with a series of pins 41 inserted in the sides of the hoop preferably as nearly adjacent as possible to the diameter of the hoop whereby a filament 42 is wound back and forth across said pins to form a reversibly extending mat. Terminals are simply made through the use of hollow rivets 43 extending through the side walls of the hoop. The filament ends and the terminal leads are passed through the rivets and soldered in place.

In Fig. 27 longitudinal threads 45 are attached to a support frame 46 of any of the forms disclosed herein but preferably of the flexible arched Bakelite type of Fig. 1. A transverse strain filament 47 is woven in or attached to the threads to form a reversibly extending strain gauge element. The ends of the filament and the necessary conductor leads extend through and are soldered to hollow rivets 48 formed in the support frame. This arrangement is especially useful in measuring strain on the surface of cylinders in the axial direction as shown in Fig. 31, the flexible frame allowing the parallel filaments to be applied to the curved surface in an axial direction. The filament can also be woven at an angle to the support threads as for instance for a torsion element having a cylindrical surface wherein filament 49, Fig. 28, is wound at 45 degrees to the support threads 45. If desired, a filament 50, Fig. 29, may be wound with multiple filament sections to give double direction properties, the two 45 degree sections being used either in series or in parallel with each other or independently as may be desired. A useful torsion gauge is provided when the filament sections are respectively connected in opposite arms of a Wheatstone bridge.

In case of a long gauge of the type having thread supports 51, corresponding to the threads 45, intermediate spreaders 52 may be inserted between the parallel threads. The structure of this gauge may otherwise be the same as shown in any one of Figs. 26 to 29, the particular figure selected depending upon the character of test under consideration.

In Figs. 19, 20 and 21 several forms of open windings are attached to a ring support 54. A delta type filament 55 is supported on pins 56 extending into the side of the ring and the filament lies flat across the bottom surface of the ring thereby insuring uniform contact of the filament with the member under test. An orthogonal filament 57 is provided in a multiple strand gauge or, if desired, a single filament gauge 58 of the orthogonal type may be employed as shown in Fig. 21. In Fig. 23 a rosette gauge arrangement 59 is supported upon inner and outer annular rings 60 and 61 each having pins 62 to which the filaments are connected. The forms shown in Figs. 19, 21, 22 and 23 are useful for strain circle determination or average strain measurements. The filament 63 is supported upon a series of radial threads 64 secured to the ring 65. The terminal end or ends of the filament may be soldered or otherwise secured to hollow rivets 66 in the manner previously described for other forms and a similar type of connection may be employed for any of the filaments shown in the other forms. The spider web or spiral type of gauge, Fig. 20, is useful for measuring central force strain patterns as found in diaphragms or point loadings on plates. In a rosette gauge the strain sensitive filaments extend in different directions within a localized area so that the direction of strain within this area may be determined. If the gauge filaments extend in crossed directions one of these filaments will most likely be subjected to a greater strain than the other filaments, the maximum strained filament representing the direction of maximum stress. Or if all of the filaments are interconnected in series in the manner shown in Figs. 19 and 20, then the average strain condition is obtained for that given localized area.

A very desirable and useful form of strain gauge is what is herein termed the terminal block strand or type illustrated in Figs. 32 to 35. In this arrangement the filament 68 is connected to terminal leads 69 at a small junction block 70 of insulation while the strain sensitive filament is unsupported. The insulating block 70 contains two small hollow rivets 71 and 72 to which the terminal leads 69 and ends of the filament 68 are attached preferably by soldering. The filament is of the parallel strand type having a length of thread 74 at its free end. The filament strands are insulated either with enamel or silk covering and the whole structure with the exception of thread 74 is treated with a varnish material like "Glyptal" to bond the filament to the terminal block and to make the double filament a single strand. A thread 75 on the terminal block is for binding the block to a test member. Fig. 33 shows the application of this gauge to a cantilever member 76, the thread 74 being wrapped around the end of the member 76 to hold the free end of filament 68 in position. This device constitutes what might be called an electro-mechanical transducer. The terminal block is suitably held by threads 75 and the filament is bonded throughout its length to member 76 by any suitable cement such as mentioned herein or its equivalent.

As shown in Fig. 35, a single terminal block 78 may have several filament strands 79 and 80 which are diagonally wrapped in opposite directions around a rod 81 of circular or other desired cross-sectional shape, the strands making an angle of preferably 45 degrees to the rod axis to obtain torsional measurements. The free ends of the filament strands are secured to the shaft by threads 82 and 83 and the filaments are cemented throughout their length to the rod or shaft surface. The two strand filament sections are connected into opposite arms of a measuring bridge, such as a Wheatstone bridge.

Fig. 38 illustrates a further application of the terminal block type of gauge. The filament strand 84 is wound in a close helix around the dynamometer shank 85 of a tension test specimen 86 which is provided with screw threads at each end to be gripped in a suitable testing machine or loading device. The block 70 is held by the wrapping threads 75 and the terminal end of the filament is held by the wrapping thread 74. These threads 75 and 74 firmly hold the filament in place while the cement makes a bond of the entire length of the filament to the dynamometer circuit. Thus it is seen from Figs. 33, 35 and 38 that the holding threads perform a very simple and useful function during the cementing of the filament to the member.

As shown in Fig. 36, multi-strand unsupported gauge filaments are easily constructed in my open type gauge by winding the strands between two small comb structures 89 and 90 formed of thin fiber sheets slotted as at 91 to receive the filament 92. Terminal rivets 93 are provided to connect the filament and the main leads. The filament can be pre-insulated as by enamel or by silk covering if desired, or post-insulated by dipping and baking on wire enamel. In the former case a varnish is required to cement the filament in place on the combs to form a unitary gauge structure. The strain filament element of this modification is quite flexible and can be mounted on curved surfaces with ease. The filament is cemented to the test member in either of the manners previously described while small pieces of adhesive tape may be used to hold the combs in place on the specimen. The gauge is of such a character that it may be used in the fashion of a parallelogram as shown at 94, Fig. 37.

Another open type gauge structure is shown in Fig. 16 wherein a filament 96 is supported on the points of a saw tooth sheet structure 97. The wire is thus not only supported at a multitude of points but is also well ventilated so that the cement used in attaching the filament to a member may set rapidly. Other similar types of sheet or card type gauges are possible, one example being the elimination of the saw teeth as shown in Fig. 18 wherein the filament is cemented directly to the continuous straight edge of a thin piece of fiber 98. If desired, the fiber may have cutout portions 99 to reduce the longitudinal stiffness produced by the supporting member although the sheet may be continuously solid by omitting the cutout portions 99. The sheet supporting structure in this type of gauge may be any suitable thin insulating material such as fiber, paper, balsa wood or equivalent material. This general type of gauge is herein referred to as the card type because of its thin supporting card-like nature. In any case, the thin support allows the filament in Fig. 18 to be laterally exposed and in Fig. 16 and others to be additionally exposed vertically, thereby to provide rapid drying of the cement which is used to bond the filament to the test structure.

This edge supported or card type gauges are also useful in building up more complicated gauges. For instance, a long card can be rolled into a cylinder 100, Fig. 24, which is useful in making measurements of diaphragms. A block of the card gauges can be set up as at 101 separated by any desired thickness of spacers 102 depending upon the area or gauge resistance required. Another useful form of this edge type gauge is generally indicated at 103 and specifically shown as having a saw tooth edge applicable for concave surfaces. Compound gauges built up from such curved edge cards whether they be concave or convex can be arranged to fit any conceivable surface form and have the filament oriented in the desired direction.

A further modification of the card type gauge is shown in Fig. 39 where the longitudinal stiffness of the card is reduced by vertically corrugating the card as indicated at 104. The filament 105 spans across the ends of the successive corrugations and is cemented to the edges thereof while the heretofore described hollow rivet terminals 106 are provided for connecting the filament ends and the main terminal leads. Similar rivet terminals are used in all of the card forms and are identified at 106. In addition to the longitudinal pliability, the corrugated structure produces a more stable supporting base and also permits, if desired, a multi-loop filament to be mounted on a relatively wide base. The corrugated card type gauge as described permits a slight amount of flexibility in a direction transversely of the corrugations as may be required for use on curved surfaces.

By mounting the filament on the side of the corrugated sheet as indicated at 107, Fig. 39, a very large amount of flexibility is permitted for curved surfaces. While Fig. 39 also shows a double strand bottom filament 105 together with the side filament 107, yet it will be understood that this corrugated support may be provided with only a side filament or only a bottom filament as may be required for a particular application.

In order to prevent overstraining of the filament during assembly of the corrugated type gauge support it is sometimes desirable to add additional longitudinal stiffness which is specifically shown herein as fibers or wires 108, Fig. 40, extending across the edges of the corrugations and cemented thereto. The strain sensitive filament is indicated at 109 and is preferably placed between the upper and lower two supporting wires. The corrugated card with the side filament 109 lends itself as shown in Fig. 41 to a curved surface 110 and because of the flexibility of this type of gauge it is equally applicable to a concave surface or to a flat surface. It will be understood that in all of the modifications disclosed herein the method described of bonding the entire effective length of the filament of any one gauge to the test member or of securing the filament to its supporting structure or if insulating the filament by enamel or silk covering is applicable to all forms of the gauge disclosed herein.

From the foregoing disclosure of the several modifications, it is seen that the filament of my improved gauge is open around, or substantially around, its entire circumference or is normally open throughout its length when initially applied to a member to be strained whereby the bonding cement may be applied directly to the filament and members. This is not only conducive to quick setting of the cement by reason of rapid evaporation of the solvent from the entirely exposed cement but also effects a direct and efficient bonding of the entire effective length of the filament to the test member. Another very desirable feature is that the open type structure permits easy and rapid removal of the gauge element from the test member. If an evaporating solvent setting cement like "Duco" household cement is used the application of the filament to the test member is facilitated by the ease of evaporation of the solvent through the open structure and in the same way the open structure permits a cement solvent to be applied efficiently for removal of the gauge. A few solvents among others that may be used for removal of a gauge are "duPont 3601 thinner," "acetone," "Cellosolve" and "butyl acetate." All that is required for removal of a filament is to flood the gauge surface with the cement solvent. The thin bonding layer of cement is immediately liquefied and the gauge easily removed. After washing off any remaining cement from the gauge it is ready for reapplication with new cement at another point. A further point of novelty is the application of the insulation to the filament after it is fitted to its supporting member. This is done by dipping the filament and its supporting structure in a wire enamel and baking, a suitable thickness of enamel on the filament being built up by successive dipping and baking. In the gauges employing either pre-enameled or fabric covered filaments an impregnation of baking varnish like "Glyptal" is used to cement the filament and its support together thereby forming a coating which is impervious to the bonding cement solvent or to the solvent used subsequently for removing the gauge from the test member. Thus the basic insulation and the unitary structure of the filament and its support are not affected by the cement or by the removing solvent. Most of the baking enamels such as "Glyptal" or "Harvel 512C" are suitable to be used with cement of the solvent type such as "Duco" household cement. While my improved gauge is shown as of the open type having many desirable characteristics herein set forth, yet it will be understood that under certain circumstances the various forms of gauges might be employed in connection with a membrane of paper or other insulating material attached to the filament. In addition to the above functional advantages as well as others, my improved gauge is economical in construction, operation and is simple and direct in its use combined with accuracy, sensitivity and reliability.

Broadly, the improved method embodied in my invention consists in positioning a strain filament on a test member and bonding the filament throughout its entire effective length by a solvent cement which is directly exposed to the air thereby facilitating a maximum rate of evaporation of the cement solvent and consequent hardening of the cement, a further step being to apply to the filament an insulating coating which is impervious to the bonding cement and of removing the filament by applying a solvent to the cement whereby the filament may be removed after completion of the test and then reused.

In the form of gauge having a flexible arch support the filament may, if desired, be loosely connected between the ends of the flexible support whereby when this support is pressed down on to a test member the support will tend to flatten out and accordingly straighten the filament. This produces a holding pressure on the filament during drying of the cement. Also in the card type gauges the relatively large depth of the thin cards of sheets serves as a finger grip in applying the filament to a test member and also insures a uniform holding pressure along the entire length of gauge.

It will of course be understood that various changes in details of construction and arrangement of parts may be made by those skilled in the art without departing from the spirit of the invention as set forth in the appended claims.

I claim:

1. A strain gauge comprising, in combination, a strain sensitive filament of electrical conducting material whose resistance varies with its strain adapted to be bonded throughout its gauge length to a test member, supporting means connected to one end of said filament, and supporting means connected to the other end of said filament and movable relative to said other supporting means, whereby the two supporting means may be manually manipulated so that the entire gage length of the filament may be openly placed against the surface of the test member to allow a bonding material for the filament to be substantially entirely exposed to the air while the filament is held in position by both of said supporting means.

2. A strain gauge comprising, in combination, a strain sensitive filament of electrical conducting material whose resistance varies with its strain adapted to be bonded throughout its gauge length to a test member, and means for supporting said filament at and between its ends while allowing the filament to be laterally exposed and its ends manually movable relative to each other, whereby the entire gauge length of the filament may be placed against the surface of the test member and be bonded thereto by cement which is directly laterally exposed to the atmosphere.

3. A strain gauge comprising, in combination, a strain sensitive filament of electrical conducting material whose resistance varies with its strain adapted to be bonded throughout its gauge length to a test member, supporting means for one end of said filament, and terminal block means of insulating material formed as a unitary part of said filament to support the other end thereof and adapted to allow the full gauge length of the filament to be flexible so that it may be placed on a curved surface.

4. A strain gauge comprising, in combination, a single supporting member, and a strain sensitive filament of electrical conducting material whose resistance varies with its strain, said filament having its ends connected adjacent to each other on said single supporting member to form a self-contained unitary device between the supporting means and filament, and said filament also extending freely and flexibly from said support when not in use whereby said filament is normally completely exposed but is adapted to be bonded by a bonding medium throughout its gauge length to a test member thereby to fully expose the bonding medium directly to the atmosphere.

5. A strain gauge comprising, in combination, a terminal block, a strain sensitive filament of electrical conducting material whose resistance varies with its strain adapted to be bonded throughout its gauge length to a test member and being flexibly connected at one end to said terminal block, and a thread connected to the other end of said filament whereby the terminal block and thread provide finger grips by which the filament may be placed upon the surface of a member to be tested.

6. A strain gauge comprising, in combination, a strain sensitive filament adapted to be bonded throughout its gauge length to a test member, and a resilient arch suport connected to the ends of said filament to support the same.

7. A strain gauge comprising, in combination, a strain sensitive filament adapted to be bonded throughout its gauge length to a test member, and flexible means connecting the ends of said filament whereby the filament is adapted to be rendered slightly taut when pressure is applied to the flexible means during positioning of a filament to a member under test.

8. A strain gauge comprising, in combination, a relatively thin sheet member, and a strain sensitive filament whose ends are connected to said sheet member and said filament extending from one end of said sheet member to the other end along an edge thereof to be supported by said edge when applied to a member subject to strain.

9. A strain gauge comprising, in combination, a sheet supporting member adapted to have flexibility in a transverse direction, a strain sensitive filament whose ends are connected to said sheet member and said filament being supported by and along an edge of said sheet and adapted to conform to any transverse flexibility of the sheet, said sheet offering sufficient rigidity in a direction at right angles to said transverse direction to allow an operator to place the filament on the surface of a test member and to bond the filament firmly thereto throughout its gauge length.

10. A strain gauge comprising, in combination, a strain sensitive filament of electrical conducting material whose resistance varies with its strain adapted to be bonded throughout its gauge length to a test member, means extending continuously for substantially the full length of said filament and having indented portions alternated with protruding portions which engage and apply a holding and positioning force on said filament at points along its gauge length thereby to openly support the filament substantially throughout its length, and means whereby the ends of said filament are attached to said other means to provide a unitary self-contained structure therewith.

11. A strain gauge comprising, in combination, a strain sensitive filament normally openly suspended and adapted to be bonded throughout its gauge length to a test member by application of a bonding medium directly to the filament and to a member subject to strain, a supporting frame having spaced portions, and threads connected to and suspended between said spaced portions, said filament being connected to and extending in a direction transversely of the threads so as to maintain the open suspension of the filament whereby the bonding medium when applied to the filament is fully and directly exposed to the atmosphere.

12. A strain gauge comprising, in combination, a strain sensitive filament adapted to be bonded throughout its gauge length to a test member, and a card-like support having a saw tooth edge on which said filament is supported as a unitary part of said card whereby the bonding material for said filament is substantially entirely exposed to the atmosphere during application of the filament to the surface of a test member.

13. A strain gauge comprising, in combination, a terminal member, a strain sensitive filament of electrical conducting material whose resistance varies with its strain and adapted to be bonded throughout its gauge length to a test member, said filament having a reverse bend so as to be doubled back upon itself to provide reversely extending strands whose ends are flexibly connected to said terminal member, and a thread connected to the reverse bend of said filament whereby the terminal member and thread provide finger grips by which the filament may be placed upon the surface of a member to be tested.

EDWARD E. SIMMONS, Jr.